United States Patent
White et al.

[11] 3,790,901
[45] Feb. 5, 1974

[54] ELECTRO-OPTICALLY INDUCED WEAK COUPLING OF ADJACENT CARBON DIOXIDE LASER MODES

[75] Inventors: Matthew B. White, Newport Beach; Wesley Duane Gerber, Santa Ana, both of Calif.

[73] Assignee: Philco-Ford Corporation, Philadelphia, Pa.

[22] Filed: Mar. 22, 1972

[21] Appl. No.: 237,038

[52] U.S. Cl. ............... 331/94.5, 250/199, 350/150, 350/160
[51] Int. Cl. ............................................. H01s 3/10
[58] Field of Search .... 331/94.5; 250/199; 350/150, 350/160

[56] References Cited
UNITED STATES PATENTS
3,500,233  3/1970  Doyle et al. ..................... 331/94.5

OTHER PUBLICATIONS
White et al. IEEE J. Quantum Electronics, Vol. QE6, No. 7, July 1970, pp. 457–462.
Kambara et al. Japan J. of Applied Physics, Vol. 6, No. 12, Dec. 1967, pp. 1,368–1,370.
White et al., IEEE J. Quantum Electronics, 5(6), June, 1969, p. 329.

Primary Examiner—John K. Corbin
Assistant Examiner—R. J. Webster
Attorney, Agent, or Firm—Robert D. Sanborn; Gail W. Woodward

[57] ABSTRACT

A low level polarization modulation is applied to a carbon dioxide dual-polarization laser. The modulation frequency is approximately equal to the difference in frequency between allowed orthogonally polarized adjacent laser modes. This modulation insures dual-polarization operation in the carbon dioxide laser, which, in the absence of such modulation, will only oscillate in one mode. Adjacent mode coupling is ordinarily so strong that the oscillating mode suppresses the adjacent mode. Since the polarization modulation offsets the adjacent mode coupling it is called electro-optically induced weak coupling or EIWC.

9 Claims, 4 Drawing Figures

ELECTRO-OPTICALLY INDUCED WEAK COUPLING OF ADJACENT CARBON DIOXIDE LASER MODES

BACKGROUND OF THE INVENTION

Dual polarization (i.e. D. P.) laser operation has provided a number of useful advantages because the output produced can be made to consist of two adjacent modes having precisely orthogonal polarizations and a controllable frequency separation. The D. P. effect is readily produced by incorporating an optical element having linear birefringence inside an otherwise isotropic laser optical cavity. Since a stationary optical standing wave pattern will occur only for those signals that are polarized either parallel to or orthogonal to the principal axis of the birefringent element, oscillation will be constrained to modes having one of these directions of polarization. Because of the refractive index difference, the optical cavity length for the parallel and orthogonal modes will be slightly different and consequently the oscillation frequency of one mode will be slightly displaced with respect to that of the other. Thus both the polarizations and frequency difference of adjacent modes will be controlled by the character of the optical element. If the birefringent element is electrically modulated, the adjacent mode frequency difference will be modulated accordingly. In a D. P. system two orthogonally polarized, spacially congruent optical beams will be produced and their frequency difference can be modulated by means of intelligence carrying electrical signals. If both beams are carried over an optical path and then beat together in an optical detector, the electrical intelligence-carrying signal can be recovered. In effect one optical beam acts as a local oscillator for the other. Since both beams will be subjected to substantially the same path turbulence, the effects of such turbulence will be minimized. Since the modulation and demodulation involves a relatively high intermediate frequency, the advantages of superheterodyne action can be realized. Additionally the mutually orthogonal adjacent modes are easily separated with polarization sensitive devices thereby making it possible to stabilize the operating frequency of the laser with relatively simple devices.

The carbon dioxide laser has many useful transitions in the 9–11 micron wavelength range. These wavelengths, being located in an atmospheric window region, are extremely useful for communications and ranging. Many infrared wavelengths are strongly absorbed by the atmosphere and are therefore of limited value. Accordingly it would be highly desirable to operate the carbon dioxide laser in the dual-polarization mode.

Dual-polarization operation has been applied successfully to many gas laser systems. However the carbon dioxide laser exhibits such a high degree of adjacent mode coupling that it is difficult to find a resonator condition that results in the simultaneous operation of adjacent modes. The oscillating mode extracts useful energy from the adjacent mode to the extent that the adjacent mode will not oscillate. In effect, one mode suppresses the other. Hence, dual polarization operation cannot be achieved in an ordinary "free running" $CO_2$ laser.

SUMMARY OF THE INVENTION

It is an object of the invention to provide a carbon dioxide laser which will operate in the dual-polarization mode.

It is a further object to provide a laser in which dual-polarization is produced by electro-optically inducing weak adjacent mode coupling with an electro-optical element.

These and other objects are achieved by internal polarization modulation of a dual-polarization carbon dioxide laser at a frequency equal to the adjacent mode separation. A bias birefringence is incorporated inside the laser cavity in the usual manner to make dual-polarization operation possible. A second birefringence-producing electro-optical modulator device is also included in the cavity. This modulator in the absence of an electrical signal is made very weak relative to the bias device and its axis is rotated, preferably at 45°, with respect to the bias device. When a voltage is applied to the modulator, its birefringence increases and it will tend to pull the laser polarization away from that value established by the bias device. If an alternating voltage is applied to the modulator the nominal polarization will be modulated or cyclically rotated. It has been discovered that if the polarization is modulated at a frequency equal to the mode separation introduced by the bias device, a very low level of modulation will cause a redistribution of energy between the allowed adjacent modes of a $CO_2$ laser and will thereby effect induced weak coupling between the modes and allow them to oscillate simultaneously. Therefore, in the presence of such modulation dual-polarization operation of the laser can be achieved. Electro-optically induced weak coupling of this kind is hereinafter referred to as EIWC.

DESCRIPTION OF THE PREFERRED EMBODIMENTS

Figure 1:
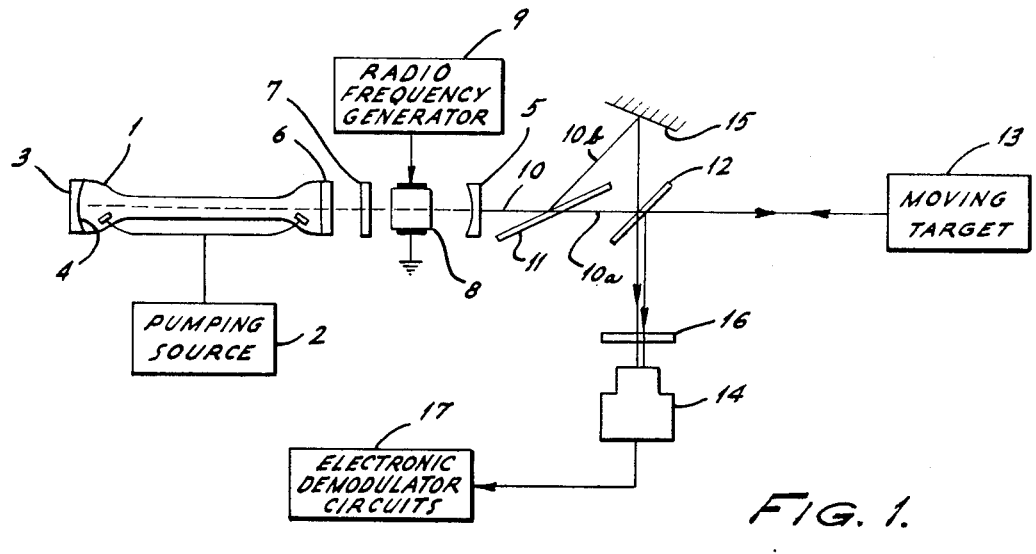
FIG. 1 shows a velocity measuring system using a carbon dioxide laser and EIWC.

Referring to FIG. 1, laser gas tube 1 contains carbon dioxide suitably pumped by a D-C voltage source 2. End closure 3 incorporates a reflective surface 4 which is confocal with reflector 5. Together these elements form an optical resonator or cavity. Reflector 5 is partly transmissive to permit energy to be extracted from the resonator. Antireflection coated window 6 closes the other end of the laser gas tube. In general a laser tube such as the one shown in FIG. 1 will not discriminate against or favor any particular polarization direction and will produce laser energy as dictated by the optical elements external to the laser tube.

Element 7, having suitable linear birefringence, establishes the desired dual-polarization laser characteristic. This element has a birefringence axis and the only stationary laser modes that can be supported in the system must be polarized either parallel to or orthogonal to this axis.

If desired the linear birefringent element 7 can be antireflection coated and used to replace window 6 provided that its character is such that it will operate as a window.

The birefringence of element 7 can be controlled electrically (by means not shown) if desired. In certain materials the characteristic can be induced by an electrostatic or magnetic field. Such devices are useful where it is desired to control or modulate the birefringence.

With the elements described thus far, dual-polarization laser operation will occur if the coupling between adjacent allowed modes is weak. The pumping source creates a plasma in the gas or active medium confined within the laser tube, thereby creating an inversion of energy states. The gas will fluoresce and will ordinarily emit optical energy over a relatively broad band in all directions. By locating the active medium inside an optical resonant cavity that has resonant modes within the fluorescence bandwidth, laser action takes place. For an optical path within the cavity for which a stationary standing wave pattern can be developed, the excited gas will emit coherent photons that in turn induce further transitions in the gas to produce a monochromatic energy release that can be tapped by way of the partly transmissive reflector. The anisotropy of the birefringent element will confine the polarization of the standing wave pattern to lie among its birefringence axis or the orthogonal axis. Since the refractive index is different for these two axes, an orthogonal mode will have a different frequency than that of the parallel mode, the difference being related to the strength of birefringence.

Many lasers of the type described above will naturally oscillate simultaneously in both modes because the cross coupling between modes is small. However, the carbon dioxide laser exhibits strong coupling between such modes to the extent that it is quite difficult to excite both modes at once. In the latter case the oscillating mode extracts energy from the other mode to the extent that only one will oscillate. Adjusting mirror spacing will cause the oscillation to flip from one mode to the other, but only with great difficulty can an adjustment be found where both modes are supported together. When dual-polarization is desired, this characteristic of the carbon dioxide laser is quite undesirable.

We have discovered that a relatively simple expedient will permit dual-polarization operation of carbon dioxide lasers. If the laser is subjected to weak polarization modulation at the frequency separation of the orthogonal and parallel modes, dual-polarization operation occurs.

Element 8 of FIG. 1 is a polarization modulator. It is a birefringence element for which the magnitude of birefringence is varied electrically by means of a radio frequency generator 9. The birefringence axis of element 8 is oriented desirably at 45° with respect to that of element 7. The nominal magnitude of birefringence is made small with respect to that of element 7. When element 8 is driven electrically by generator 9, the strength of element 8 will vary and it will tend to rotate the polarization of the laser away from the original direction established by element 7.

If element 8 is driven at the frequency represented by the frequency difference between the mutually orthogonal adjacent laser modes established by element 7, the laser can be made to oscillate simultaneously in both modes.

The output of the laser cavity, indicated by solid line 10, contains both polarizations. Beam splitter 11 is a transparent plate angled so that it is polarization sensitive. The optical component polarized parallel to the plane of incidence at splitter 11 will be transmitted along path 10a while the orthogonally polarized component will be reflected along path 10b. The signal at 10a is transmitted through isotropic beam splitter 12 to remote target 13, whereupon it is reflected back to beam splitter 12. A portion of the target return energy is reflected from beam splitter 12 toward an optical detector. This detector also receives a heterodyne signal from laser output 10b which has been reflected by front surface mirror 15. Since the two signals applied to photodetector 14 are mutually orthogonal, a polarizer 16, oriented at 45° with respect to the beam polarity, is incorporated to provide mixing action. The output of photodetector 14, which is nominally responsive to the laser wavelength, will include an electrical frequency component equal to the difference in frequency between the optical input signals. When target 13 is not moving this frequency will be determined by the magnitude of birefringence in element 7. Assuming that signal 10 a is lower in frequency than 10b, moving target 13 toward the laser will lower the beat frequency output from detector 14. A receding target will produce a beat frequency increase. The electronic demodulator circuits 17 sense and convert the beat frequency values to the relative speed of the moving target 13.

Since the laser is operating in the 9–11 micron region, a region of high atmospheric transparency, long range operation is feasible. Furthermore the relatively long wavelength is not greatly disturbed by the fine aerosol particles found in fog and haze.

Figure 2:
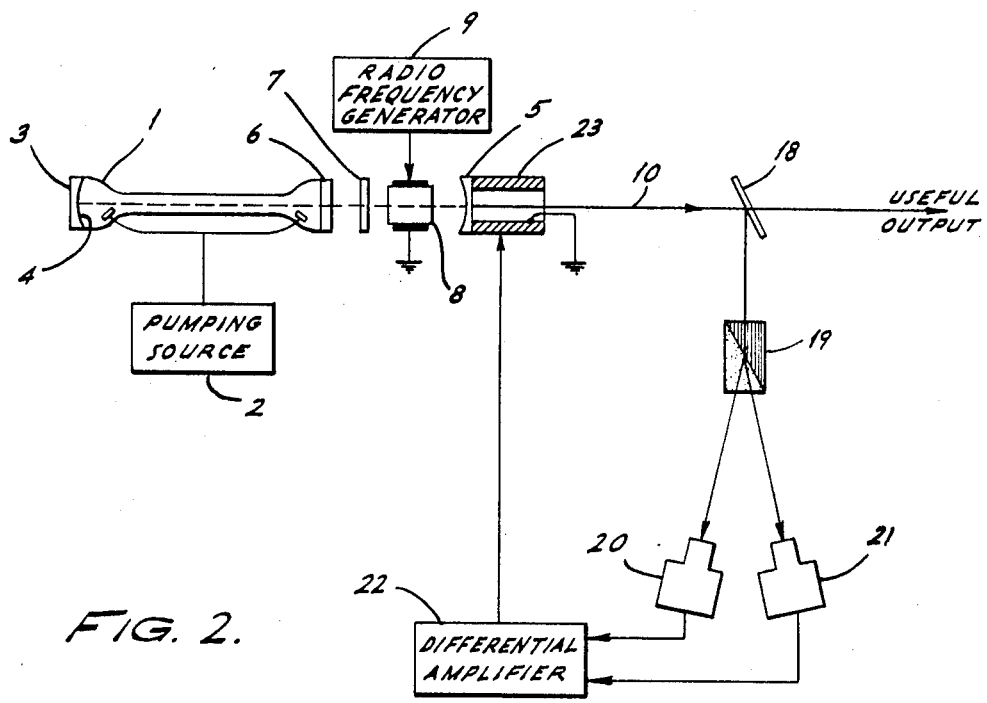
FIG. 2 shows a carbon dioxide laser employing EIWC and a frequency stabilization system.

FIG. 2 illustrates how EIWC can be used in a stabilized laser. Laser tube 1 with its pumping source 2, endplate 3 and mirror surface 4, and partly transmissive mirror 5 are similar to the FIG. 1 showing except that mirror 5 can be moved in an axial direction by means of piezoelectric transducer 23. Linear birefringence element 7 provides a dual-polarization offset frequency, and modulator 8, driven by radio frequency generator 9, induces weak coupling. Thereby dual-polarization operation is promoted as described above and output beam 10 includes two spacially congruent beams that are polarized orthogonally and at slightly different optical frequencies. Isotropic beam splitter 18 diverts a portion of beam 10 to polarization dependent beam splitter 19. The remainder of the output beam (usually a major portion) is available for the intended application as useful output. Polarization sensitive beam splitter 19, for example a Wollaston prism, causes the orthogonally polarized laser output components to diverge so that photodetector 20 receives one polarization and photodetector 21 receives the other polarization. The photodetectors 20 and 21 feed a differential amplifier 22 that controls the signal on piezoelectric transducer 23. In operation the output of differential amplifier 22 will adjust transducer 23 to vary the laser cavity length until the outputs from photodetectors 20 and 21 are equal. This will stabilize the laser cavity length and therefore the absolute frequencies of the output modes. With a conventional carbon dioxide laser such a simple stabilization system is not operable. However by the inclusion of EIWC, as established by elements 8 and 9, excellent stabilization has been achieved.

Figure 3:
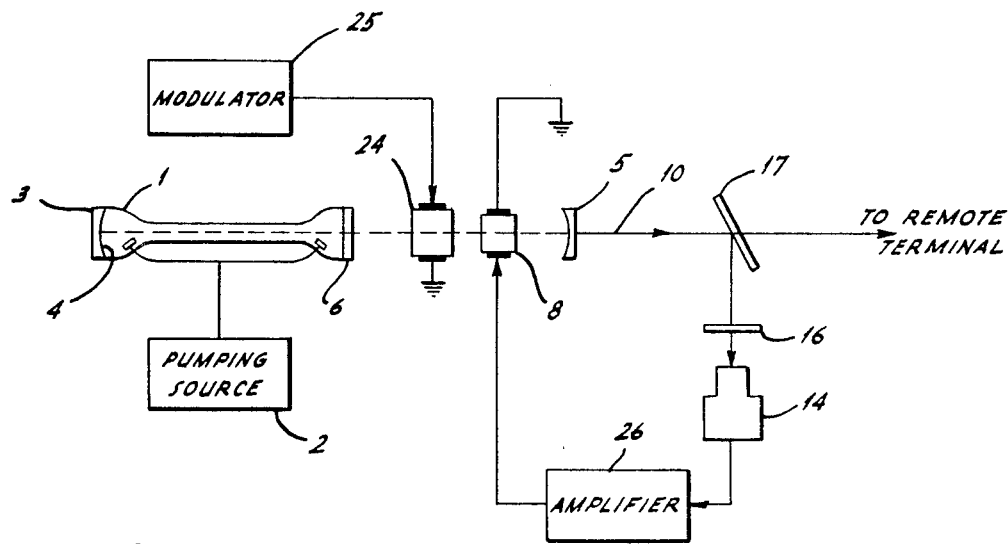
FIG. 3 shows a carbon dioxide laser communicator with self-locked EIWC.

FIG. 3 shows a communications-type dual-polarization transmitter. Laser tube 1 containing carbon dioxide as the active medium is pumped by source 2. End plate 3 closes the laser tube and includes mirror surface 4. Partly transmissive mirror 5 completes the laser resonator and window 6 closes the laser tube. Linear birefringence element 24 is electrically modulatable by modulator 25 which is to apply the communications signals to be transmitted to a remote point. As modulator 25 varies the magnitude of linear birefringence the dual-polarization laser output beams will vary in their frequency separation. Typically the modulator 25 will apply a steady state or fixed D-C bias so that the quiescent beam frequency separation will represent a fixed or carrier frequency. The intelligence to be transmitted will be in the form of an A-C signal superimposed on the D-C value. Thus the intelligence will constitute frequency modulation of the carrier. A portion of the output beam 10 is diverted by isotropic beam splitter 17 to polarizer 16 and detector 14. The remainder of the output beam is available for transmission to a remote terminal of the communications system.

Polarizer 16 is oriented at about 45° with respect to the beam polarization so that photodetector 14 will produce an electrical output signal having an A-C component of a frequency equal to the difference in frequency between the mutually orthogonal laser beams. Amplifier 26 applies this signal to polarization modulator 8. With this feedback system the polarization modulator will always be fed a signal having a frequency equal to the orthogonal laser mode spacing even though this mode spacing is continuously varying by virtue of the A-C signal applied to element 24. Hence, once it is initiated by sweeping the cavity length through the region where both D.P. modes ordinarily oscillate simultaneously on a transitory basis, D.P. operation is continuously maintained during wide band modulation of the laser. Without the polarization modulation, the carbon dioxide laser could not be used as a dual-polarization F-M transmitter.

Figure 4:
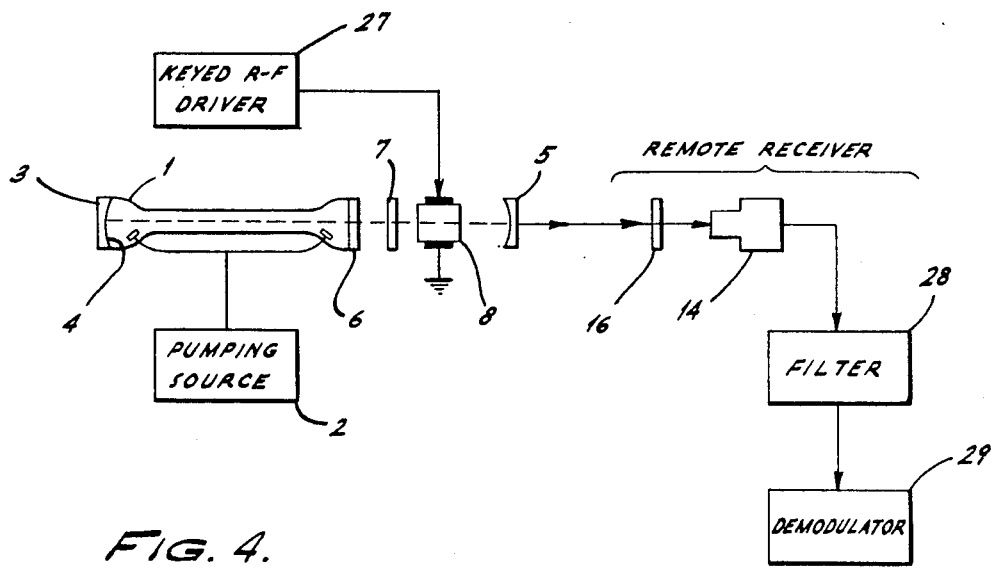
FIG. 4 shows a keyed EIWC dual-polarization carbon dioxide laser communicator.

In FIG. 4 a carbon dioxide laser, using EIWC keying, provides a communications link. The laser elements are as described above. However polarization modulator 8 is provided with an on-off radio frequency signal from keyed r-f driver 27. The radio frequency is made equal to the frequency difference between the mutually orthogonal laser modes as established by linear birefringence element 7. When the R.F. is keyed on the laser emits dual-polarization energy and when the R.F. is keyed off only one laser mode is emitted.

At the remote end of the communications link a receiver senses the laser output. Photodetector 14 senses the optical energy and polarizer 16, oriented at 45° with respect to the laser polarization, causes the mixing of the laser beams in the photodetector when two laser beams are present. Filter 28 is of the bandpass variety and is tuned to the frequency separation between the mutually orthogonal laser modes. Demodulator 29 converts the R-F signals from filter 28 into conventional pulses. When the polarization modulator 8 is keyed by R. F. the laser emits dual polarized beams and a D-C signal appears at the output of demodulator 29. When modulator 8 is keyed off only one beam is emitted and there is no output from demodulator 29. Thus a simple keyed modulator communicator is available using the EIWC feature.

EXAMPLE 1

To demonstrate EIWC a 60-cm-long 1-cm-ID carbon dioxide laser discharge tube was employed. A 1-meter resonator having a flat 90 percent reflective output coupling mirror was adjusted so that its resonant frequency could be tuned across the carbon dioxide gain profile. A stressed germanium flat, having anti-reflection coatings, was used as the linear birefringence element. (See element 7 of the drawing.) The polarization modulator 8 of the drawing was a gallium arsenide crystal 5 cm long with a 3-mm aperture. This device had a half-wavelength sensitivity of 13.5 kV.

With no voltage applied to the modulator, DP operation occurred over a laser frequency tuning range of less than 150 kHz. With 0.5 Vrms applied to the modulator, DP operation was achieved over a tuning range of up to 20 MHz. This modulation involved a birefringent phase shift of only $1.2 \times 10^{-4}$ rad.

EXAMPLE 2

Apparatus similar to the arrangement of FIG. 3 was set up using equipment as described in Example 1. The stressed birefringence element was replaced with an electro-optical crystal. The gain of amplifier 26 was adjusted to produce an output signal of about 2 Vrms. The modulator 25 supplied a 600 V D-C bias to the electro-optical crystal 24 to provide a DP mode difference of about 11 MHz. A 100 Vrms signal at 1.5 MHz from modulator 24 produced a $\pm 2.4$ MHz frequency deviation. The resulting modulation could be observed as conventional frequency modulation on a spectrum analyzer. The frequency stabilization system shown in FIG. 2 was successfully applied to the apparatus.

While several embodiments of EIWC have been shown and specific laser and other elements used to construct the systems, other applications and elements will occur to persons skilled in the related arts. The carbon dioxide laser has been described in detail because of its extreme importance. However, other such homogeneously broadened laser systems will display similar behavior. For example, YAG (yttrium aluminum garnet) lasers and ion lasers in general will be applicable to and benefit from the principle of EIWC. It is intended that the invention be limited in scope only by the following claim.

We claim:
1. A laser comprising:
   an optical resonator,
   linear birefringence means inside said resonator for producing dual polarization operating modes,
   an active medium located inside said resonator, said medium characterized by strong coupling between closely spaced oscillating modes,
   means for pumping said active medium,
   means for extracting optical energy from said resonator, and
   means located inside said resonator for inducing dual polarization operation by polarization modulation of optical energy in said resonator at a frequency approximately equal to the frequency difference of said dual polarization modes.

2. The laser of claim 1 wherein said last-named means comprises:

electrically variable birefringence means having a birefringence axis that is located at an angle with respect to the birefringence axis of said linear birefringence means, and means for applying an electrical signal to said electrically variable birefringence means, said electrical signal having a frequency of approximately the difference in frequency between said dual polarization modes.

3. The laser of claim 2 wherein said angle is about 45°.

4. The laser of claim 2 wherein said electrical signal has an amplitude slightly in excess of that value necessary to induce dual polarization operation of said laser.

5. A laser as claimed in claim 1 wherein said active medium comprises carbon dioxide.

6. In a dual polarization laser having an optical resonator, an active medium located inside said resonator, pumping means associated with said active medium, said active medium when pumped by said pumping means acting to provide the amplification for laser action, said active medium comprising a laser material characterized by such strong coupling between allowed othogonally polarized adjacent laser modes that the oscillating mode tends to suppress the adjacent mode, linear birefringence means inside said resonator to establish dual polarization operating modes of said laser, and means for extracting optical energy from said resonator, the improvement comprising:

apparatus for inducing dual polarization operation of said laser by modulating the polarization affected by said linear birefringence means at a frequency approximating the difference between said adjacent laser modes.

7. The improvement of claim 6 wherein said active medium comprises carbon dioxide.

8. The improvement of claim 6 wherein said apparatus comprises:

electrically variable birefringence means having a birefringence axis oriented at an angle with respect to the birefringence axis of said linear birefringence means, and means for applying an electrical signal to said electrically variable birefringence means at a frequency approximating that of the dual polarization mode separation.

9. The improvement of claim 8 wherein said angle is about 45°.

* * * * *